May 14, 1968  D. W. COLLINS ETAL  3,382,506
ARTIFICIAL ARM HAVING A SINGLE PULL CORD FOR UNLOCKING THE
ELBOW JOINT AND EFFECTING RELATIVE
ANGULAR MOTION OF THE FOREARM
Filed Oct. 21, 1965
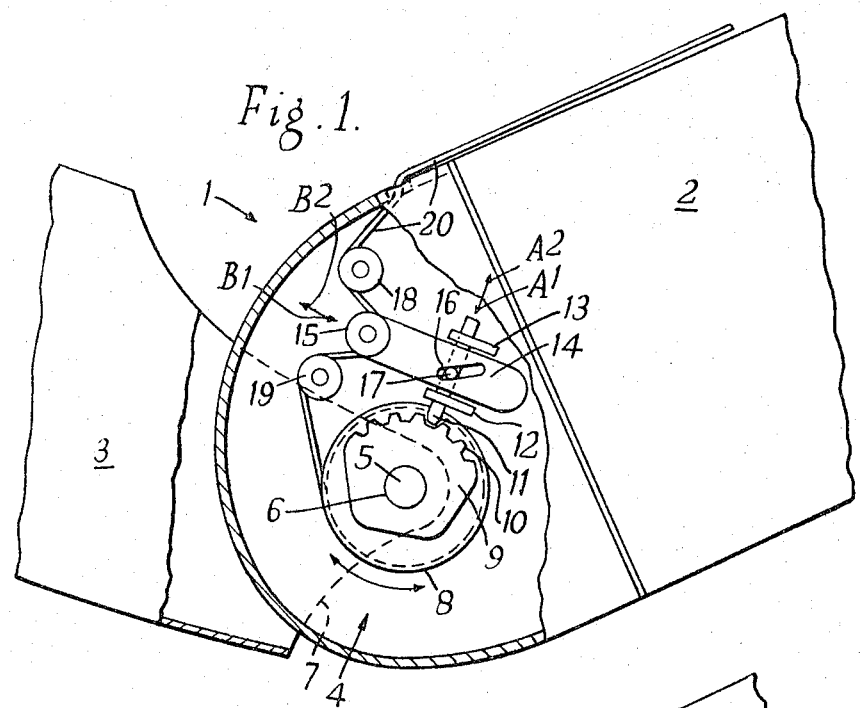
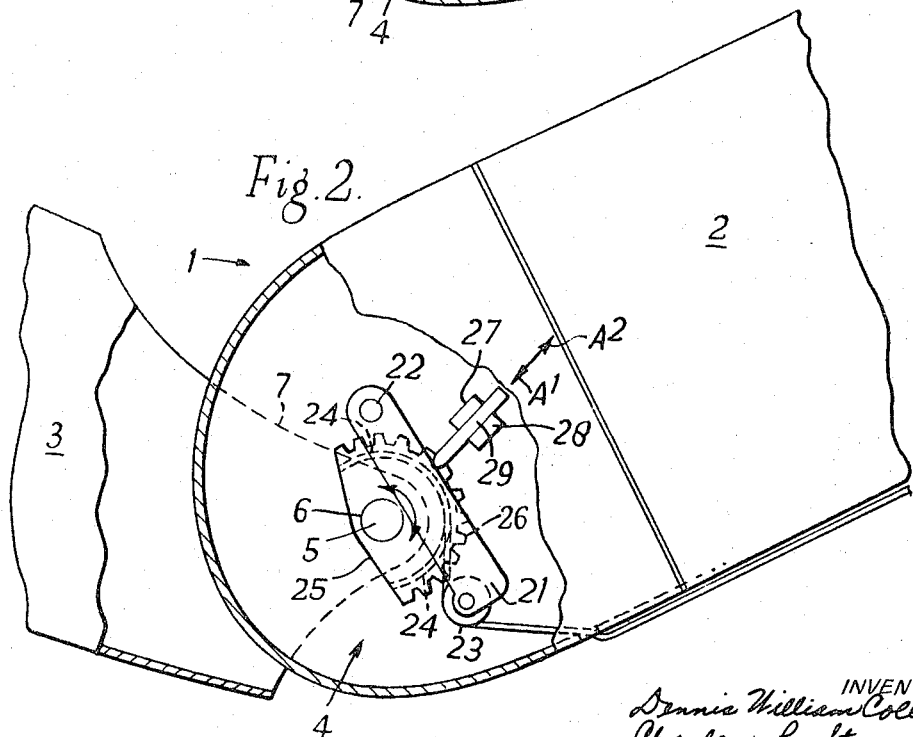
INVENTORS
Dennis William Collins
Charles P. Steeper
BY
Cushman, Darby & Cushman
ATTORNEYS

United States Patent Office 3,382,506
Patented May 14, 1968

3,382,506
ARTIFICIAL ARM HAVING A SINGLE PULL CORD FOR UNLOCKING THE ELBOW JOINT AND EFFECTING RELATIVE ANGULAR MOTION OF THE FOREARM
Dennis William Collins, 17 Haig Road, Cambridge, England, and Charles P. Steeper, 23 Shelvers Way, Tadworth, England
Filed Oct. 21, 1965, Ser. No. 499,425
Claims priority, application Great Britain, Oct. 23, 1964, 43,366/64
5 Claims. (Cl. 3—12.3)

This invention relates to prosthetic devices and more particularly to an artificial arm.

An artificial arm is known having a forearm part and an upper arm part connected together by an elbow mechanism for relative angular motion about the elbow axis. The elbow mechanism includes an arcuate toothed member which is movable with the forearm about the elbow axis, and it also includes a latch mounted on the upper arm part for engaging the toothed member to prevent the said relative motion, withdrawal of the latch from the toothed member permitting the said relative motion. An operating pull cord is connected to the toothed member and to the forearm for moving the latter.

In this known kind of artificial arm, before the wearer can operate the pull cord to move the forearm, a separate control must be operated to release the latch from its locking engagement with the toothed member. This is disadvantageous since it makes operation of the arm slow and complicates its construction, and thereby increases its cost.

It is an object of this invention to overcome these disadvantages and according to the invention an artificial arm is characterized in that the pull cord is connected to a device for engaging or withdrawing the latch respectively with or from the toothed member. With the arrangement of the invention, as soon as the pull cord is operated, and before sufficient force is exerted to move the forearm, the latch is withdrawn from the toothed member. Thus a separate operating means for the latch is not required.

Two examples will now be described with reference to the accompanying drawings, in which:

FIGURE 1 is a diagrammatic representation of the first embodiment; and

FIGURE 2 is a diagrammatic representation of the second embodiment.

Referring to FIGURE 1, an artificial arm generally indicated at 1 includes an upper arm part 2 and a forearm part 3 connected together by an elbow mechanism generally indicated at 4 for relative angular motion about the elbow axis 5. The elbow spindle, known per se, is shown at 6. It is fixed at each end in known manner to side members 7 of the forearm part 3. Fixed on the spindle 6 is a pulley 8 and fixed to the pulley 8 is an arcuate quadrant 9 having teeth 10. The forearm part 3, spindle 6, pulley 8 and quadrant 9 move in unison.

A latch 11 is slidably mounted in blocks 12, 13 carried by the upper arm part 2. The latch 11 can be engaged in, or withdrawn from, the teeth 10 of the quadrant 9 in the directions indicated by the arrows $A^1$, $A^2$ respectively.

Also slidably mounted between the blocks 12, 13, for movement in the directions, indicated by the arrows $B^1$, $B^2$, is a bar 14. Rotatably mounted at one end of this bar 14 is a pulley 15. The bar has an inclined slot 16 in which is engaged a pin 17 fixed to and projecting from the latch 11. It will be seen that movement of the bar 14 in the direction of arrow $B^1$ will cause movement of the latch 11 in the direction of arrow $A^1$, that is, into engagement with the toothed quadrant 9. Movement of the bar 14 in the direction of arrow $B^2$ will cause movement of the latch 11 in the direction of arrow $A^2$, that is, withdrawal from the toothed quadrant.

Associated with the pulley 15 are two pulleys 18, 19, whose axes are fixed with respect to the upper arm part 2.

A pull cord 20 is operable in a known manner by the wearer of the artificial arm, and passes over pulley 18, around pulley 15, over pulley 19, and over pulley 8, to which it is anchored.

It will be seen that as soon as a pull is exerted on the cord 20 the pulley 15 will be pulled in direction $B^2$ to withdraw the latch 11 from between two teeth 10, so permitting movement of the forearm to take place on continued pulling on the cord 20, which turns the pulley 8 and quadrant 9. Sudden release of the pull cord will permit movement of the bar 14 in direction $B^1$ under the action of a spring (not shown), and the latch 11 will re-engage the toothed quadrant 9.

Referring now to FIGURE 2, a lever 21 is rockably mounted at one end in the upper arm part 2 at 22. At the other end the lever 21 carries a pulley 23. Fixed on the elbow spindle 6 for movement in unison with the forearm part 3 are an arcuate pulley 24 and a toothed quadrant 25 with teeth 26. Slidably mounted in blocks 27, 28 is a locking latch 29 the lower edge of which extends parallel to the axis 5 and in contact with the lever 21. The parts are shown in a position with the locking latch 29 engaged with the teeth 26 and the lever 21 positioned under the lower edge of latch 29.

When a pull is exerted on the pull cord 20 it rocks the lever 21 about pivot 22 in a direction away from the axis 5, thereby moving the latch 29 in the direction $A^2$ for withdrawal from the toothed quadrant. Further pulling on the cord 20 moves the forearm as described in connection with FIGURE 1.

With a device in accordance with the invention, a wearer can bend and lock the arm with the minimum of body movement, and yet retain precise control of the position of the forearm part. The lock will disengage before the friction of the elbow bearing has been overcome even with the forearm part not carrying weight. When a weight is being carried, the disengagement of the lock is even quicker.

Operation is as follows:

*To raise forearm part.*—Pull on the cord to raise the forearm part, release the cord sharply to lock the forearm part in the required position.

*To lower forearm part.*—Pull on the cord sufficiently to release the lock, and lower the forearm part by releasing the pull on the cord (not sharply) until the desired position is obtained, and then release the cord sharply, thus engaging the lock.

Free up and down movement of the forearm part is obtained by retaining some tension on the pull cord.

A latch, trip, lock stop or the like may be provided to render the locking mechanism inoperative.

We claim:

1. An artificial arm comprising a forearm part; an upper arm part; an elbow joint connecting the forearm and upper arm parts for relative angular motions about the axis of the elbow joint; an arcuate toothed member movable with the forearm part about the axis of the elbow joint; a latch mounted on the upper arm part for engaging the toothed member to prevent the said relative motion, withdrawal of the latch from the toothed member permitting the said relative motion; and an operating pull cord connected to the toothed member, and to the forearm for moving the latter; the pull cord being connected to a device for engaging or withdrawing the latch respectively with or from the toothed member.

2. An artificial arm according to claim 1 in which the device for engaging or withdrawing the latch is a bar movably mounted in the upper arm and a first pulley which is associated with two other pulleys each on a fixed axis, the pull cord passing over the said two other pulleys and around the first pulley such that when the pull cord is operated the second pulley is pulled towards the two other pulleys, thereby moving the bar.

3. An artificial arm according to claim 2 in which the bar has a slot inclined to the direction of movement of the bar, which slot receives a pin on the latch.

4. An artificial arm according to claim 3 in which the direction of movement of the bar is at right angles to the direction of movement of the latch.

5. An artificial arm according to claim 1 in which the device for engaging or withdrawing the latch is a lever rockably mounted in the upper arm and carrying a pulley over which the pull cord passes, the lever engaging the latch so that when the pull cord is operated the lever is rocked.

References Cited

UNITED STATES PATENTS

| 1,272,006 | 7/1918 | Caron | 3—12.3 |
| 1,273,461 | 7/1918 | Corley | 3—12.3 |

FOREIGN PATENTS

| 114,653 | 4/1918 | Great Britain. |

RICHARD A. GAUDET, *Primary Examiner.*

R. L. FRINKS, *Assistant Examiner.*